US011694409B1

(12) United States Patent
Rahman et al.

(10) Patent No.: US 11,694,409 B1
(45) Date of Patent: Jul. 4, 2023

(54) AUGMENTED REALITY USING A SPLIT ARCHITECTURE

(71) Applicant: GOOGLE LLC, Mountain View, CA (US)

(72) Inventors: Sazzadur Rahman, San Jose, CA (US); Konstantine Nicholas John Tsotsos, Corte Madera, CA (US); João Manuel de Castro Afonso, Lisbon (PT); José Carlos Maranhão Pascoal, Lisbon (PT); Ivo Duarte, Lisbon (PT); Nuno Cruces, Portela (PT)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/643,233

(22) Filed: Dec. 8, 2021

(51) Int. Cl.
*G06T 19/00* (2011.01)
*G06T 15/04* (2011.01)

(52) U.S. Cl.
CPC ............ *G06T 19/006* (2013.01); *G06T 15/04* (2013.01)

(58) Field of Classification Search
CPC .................................................. G06T 19/006
See application file for complete search history.

(56) References Cited

U.S. PATENT DOCUMENTS

| 2015/0310669 | A1* | 10/2015 | Kamat | .................. | G06T 19/006 345/633 |
| 2018/0268611 | A1 | 9/2018 | Nourai et al. | | |
| 2019/0238818 | A1* | 8/2019 | Held | ..................... | H04N 13/139 |
| 2020/0098186 | A1* | 3/2020 | Xue | .................... | H04N 21/6587 |
| 2020/0279432 | A1 | 9/2020 | Yeoh et al. | | |
| 2021/0118357 | A1 | 4/2021 | Kuwahara et al. | | |
| 2021/0312701 | A1* | 10/2021 | Vrcelj | ..................... | G06T 15/40 |

OTHER PUBLICATIONS

"Measuring Head-Mounted Display's (HMD) Motion-To-Photon (MTP) Latency", OptoFidelity Blog; May 20, 2021, 10 pages, 2021.
Lincoln, "Low Latency Displays for Augmented Reality", (https://sreal.ucf.edu/wp-content/uploads/2018/02/dissertation_lincoln-op.pdf);2017, 101 Pages.
Nguyen, "Low-Latency Mixed Reality Headset", Department of Electrical Engineering and Computer Science; 2019, 10 pages.
International Search Report and Written Opinion for PCT Application No. PCT/US2022/081107, dated Mar. 21, 2023, 17 pages.

* cited by examiner

*Primary Examiner* — Charles Tseng
(74) *Attorney, Agent, or Firm* — Brake Hughes Bellermann LLP

(57) ABSTRACT

A split-architecture for rendering and warping world-locked AR elements, such as graphics in a navigation application, for display on augmented reality (AR) glasses is disclosed. The split-architecture can help to alleviate a resource burden on the AR glasses by performing the more complex processes associated with the rendering and warping on a computing device, while performing the less complex processes associated with the rendering and warping on the AR glasses. The AR glasses and the computing device are coupled via wireless communication, and the disclosed systems and methods address the large and variable latencies associated with the wireless communication that could otherwise make splitting these processes impractical.

20 Claims, 7 Drawing Sheets

AUGMENTED REALITY USING A SPLIT ARCHITECTURE

FIELD OF THE DISCLOSURE

The present disclosure relates to augmented reality and more specifically to a user interface based on head motion so that it appears registered in the real world as a user's head moves.

BACKGROUND

An augmented reality user interface may render content in a see-through overlay that appears layered on a user's view of the real world (i.e., optical see-through display). A graphic displayed on the optical see-through display may appear fixed in the real world as the user's head moves (i.e., world-locked user interface). A world-locked user interface (UI) for an optical see-through display is compatible with augmented reality (AR) glasses. For example, a semi-transparent graphic displayed on the AR glasses can reduce the impact on a user's view and may not require the user to change focus back and forth between the displayed graphic and the real world. Further, spatially registering the graphic with the real world provides intuitive information. Accordingly, world-locked UI's can be especially useful for applications that require high cognitive loads, such as navigating. For example, a world-locked UI may be used in AR glasses for turn-by-turn navigation and/or destination recognition.

SUMMARY

In at least one aspect, the present disclosure generally describes a method for displaying an augmented reality (AR) element on an AR display. The method includes receiving a two-dimensional (2D) texture of the AR element at an AR device that was rendered at a computing device, which is physically separate but (communicatively) coupled to the AR device in a split architecture. The method further includes warping the 2D texture of the AR element at the AR device to generate a registered 2D texture of the AR element and triggering the display of the registered 2D texture of the AR element on the AR display of the AR device.

In another aspect, the present disclosure generally describes AR glasses that include an inertial measurement unit configured to collect IMU data, a camera configured to capture camera data, a wireless interface configured to transmit and receive information to and from a computing device over a wireless communication channel, an AR display configured to display information to a user of the AR glasses, and a processor that is configured by software to display an AR element on the AR display. For this, the processor is configured to transmit the IMU data and the camera data to the computing device so that the computing device can compute high-resolution pose data based on the IMU data and the camera data, estimate a first pose based on the high-resolution pose data and an estimate of a latency corresponding to rendering, and render a two-dimensional (2D) texture of the AR element based on the first pose. The processor is then configured to receive the high-resolution pose data, the first pose, and the 2D texture of the AR element from the computing device. Based on the IMU data and the high-resolution pose data, the processor is configured to compute corrected-high-resolution pose data. The processor is further configured to estimate a second pose based on the corrected-high-resolution pose data and warp the 2D texture of the AR element based on a comparison of the second pose to the first pose. The processor is further configured to trigger display of the warped 2D texture of the AR element on the AR display.

In another aspect, the present disclosure generally describes a split-architecture, augmented-reality system that includes a computing device and AR glasses that are communicatively coupled. In the split architecture, the computing device is configured to compute high-resolution pose data, estimate a latency of rendering, estimate a first pose based on the latency and the high-resolution pose data, and render a 2D texture of an AR element based on the first pose. In the split architecture, the AR glasses are configured to collect inertial measurement unit (IMU) data and camera data; compute corrected-high-resolution pose data based on the IMU data and the high-resolution pose data; and estimate a second pose based on the corrected-high-resolution pose data. The AR glasses are further configured to compare the second pose and the first pose; warp the 2D texture of the AR element based on the comparison of the second pose to the first pose; and display the warped 2D texture of the AR element on an AR display of the AR glasses.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1A:
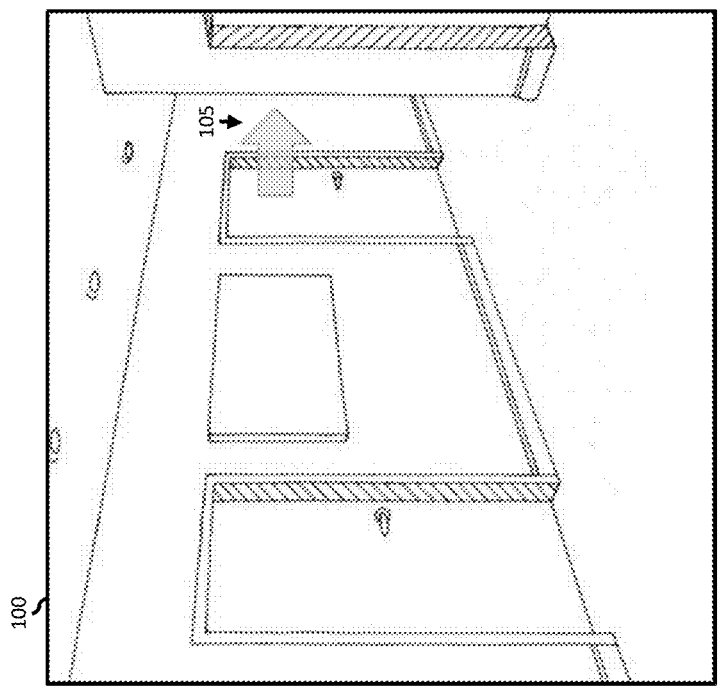
FIG. 1A illustrates a world-locked UI for augmented reality glasses from a first perspective according to an implementation of the present disclosure.

The present disclosure describes a method for augmented reality using a split architecture, and in particular, the disclosure is directed to rendering a world-locked user interface (UI) for an optical see-through display on augmented reality (AR) glasses. Rendering a graphic so that it appears world-locked (i.e., anchored) to a point in space while a user's head is free to move can require a high rendering rate to prevent a lag between the rendering and the user's head movement, which can be distracting and/or disorienting to the user. Further, the registration of the graphic with the real world requires repeated measurements of the position and orientation (i.e., pose) of the user's head as part of the rendering. A world-locked UI can present a challenge to the limited processing and/or power resources of the AR glasses. Accordingly, the processing for the measurement and rendering may be split between the AR glasses and another computing device (e.g., mobile phone, laptop computer, tablet computer, etc.). This divided processing approach is known as a split architecture, The split architecture utilizes a computing device (e.g., mobile computing device), which has more processing resources and power resources than the AR glasses, to perform the computationally complex processes of the rendering, while utilizing the AR glasses to perform the less computationally complex processes of the rendering. Accordingly, the split architecture can facilitate a world-locked UI for an optical see-through display on AR glasses without exhausting the processing/power resources of the AR glasses.

The split architecture requires communication between the mobile computing device and the AR glasses. It may be desirable for this communication to be performed wirelessly. Wireless communication can have a latency that is high (e.g., 300 milliseconds (ms)) and that can vary over a wide range (e.g., 100 ms). This latency may make rendering difficult because the rendering requires predicting a position/orientation (i.e., pose) of a user's head at the time the graphic is displayed. The pose prediction of the split architecture may be made less precise by the variability of the latency caused by the wireless communication channel. The present disclosure includes systems and methods to mitigate the latency effects of the wireless channel on a world-locked user interface (UI) for an optical see-through display on augmented reality (AR) glasses. The disclosed systems and methods may have the technical effect of providing AR elements (e.g., graphics) on an AR display that appear locked to a real-world position with less jitter and lag in response to a movement. Further, the disclosure describes systems and methods to distribute the processing between multiple devices to alleviate the processing/power burden on the AR glasses. The processing distribution may have the technical effect of extending the capabilities of the AR glasses to perform applications, such as navigation, within the limited resources (e.g., processing capacity, battery capacity) of this device.

Figure 1B:
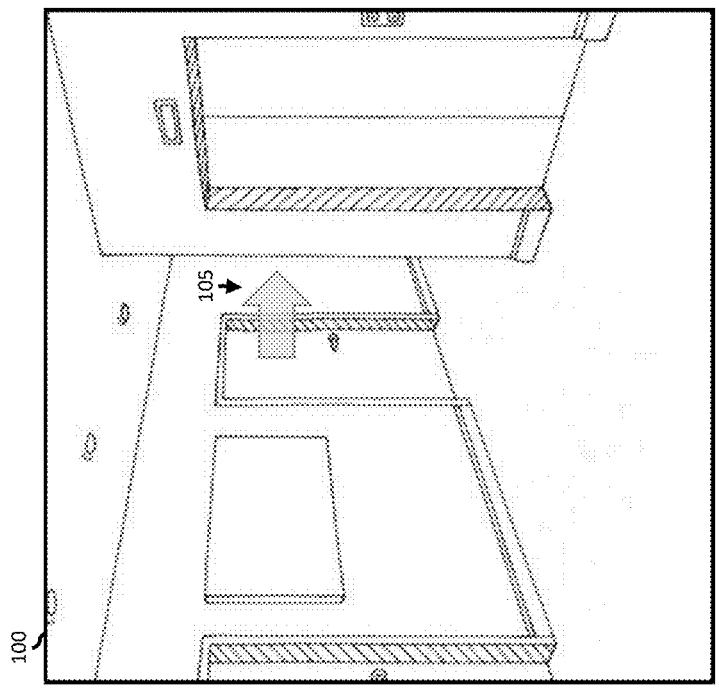
FIG. 1B illustrates a world-locked UI for augmented reality glasses from a second perspective according to an implementation of the present disclosure.

FIGS. 1A-1B illustrate a world-locked UI for augmented reality glasses in a split architecture with a computing device according to an implementation of the present disclosure. FIG. 1A illustrates an environment 100 viewed by a user through AR glasses from a first perspective (i.e., first viewpoint), and FIG. 1B illustrates the same environment 100 viewed by the user through the AR glasses from a second perspective (i.e., second viewpoint). The perspective (i.e., viewpoint) can be determined from a position (i.e., x, y, z) and/or orientation (i.e., yaw, pitch, roll) of the user's head. The combination of position and orientation can be referred to as the pose of the user's head. For the first perspective (i.e., FIG. 1A), the user's head is in a first pose 101 and for the second perspective (i.e., FIG. 1B), the user's head is in a second pose 102.

As shown, the optical see-through display (i.e., heads-up display, AR display) of the AR glasses is configured to display an AR element. An AR element can include any combination of one or more graphics, text, and images, which can be fixed or animated (e.g., animation, video). Information related to the AR element may be stored in a memory as a 3D asset. A 3D asset may be in a file format (e.g., .OBJ format) that includes information describing the AR element in three dimensions. 3D assets can be rendered into a two-dimensional (2D) image based on a determined viewpoint. The 2D image including the necessary modifications (e.g., distortions) to illustrate it as if it were viewed from a viewpoint is referred to as a 2D texture (i.e., texture). The AR element may further include information describing where it should be anchored in the environment.

Here, the AR element is a see-through graphic of an arrow 105 that is transformed to a 2D texture and overlaid on the user's view of the environment 100. The texture is world-locked (i.e., anchored, registered) to a position in the environment 100. The arrow 105 is world-locked to a position corresponding to a hallway, and its display can guide the user down the hallway to help the user navigate to a destination. The arrow 105 is world-locked because as the user's pose changes (i.e., as the user's viewpoint changes) the position of the arrow 105 relative to the hallway does not. The AR element may be world locked to a location as part of a navigation application running on AR glasses.

Figure 2:
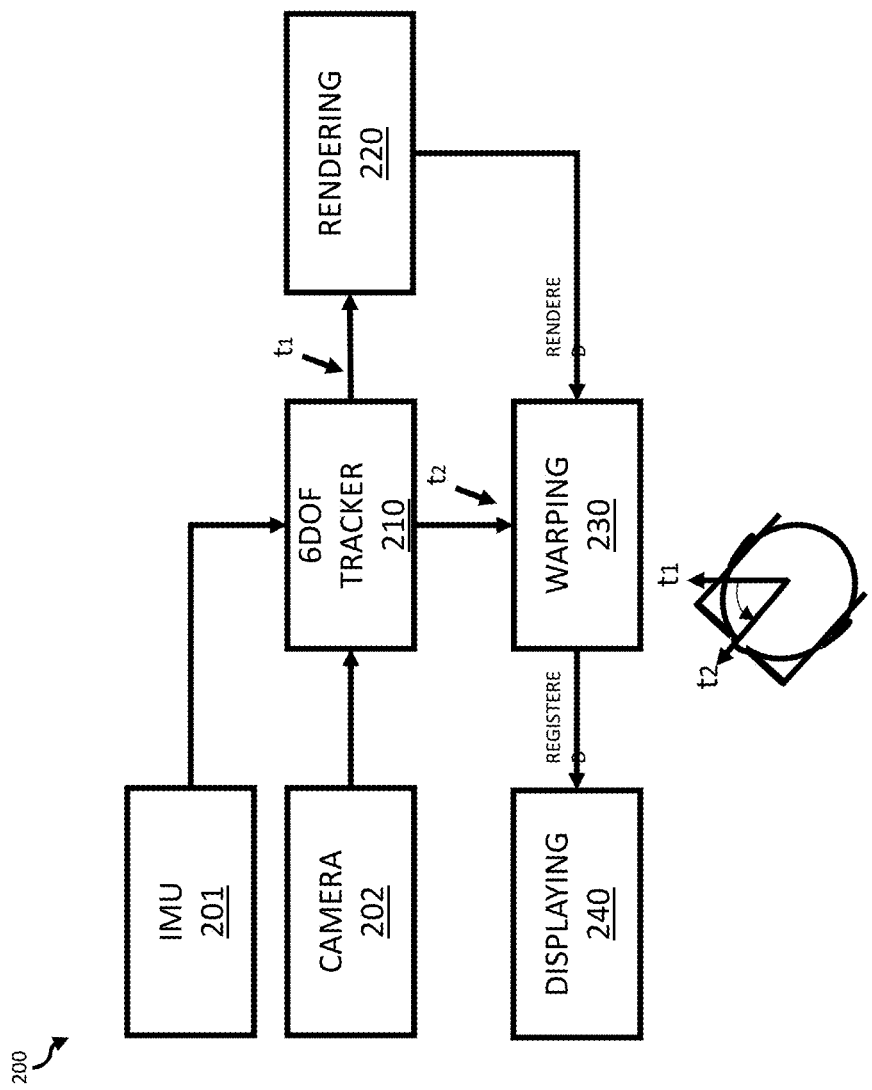
FIG. 2 is a flowchart illustrating a method to display a world-locked AR element on a display according to an implementation of the present disclosure.

FIG. 2 is a flowchart illustrating a method 200 to display a world-locked AR element on a display of AR glasses in a split architecture. World locking an AR element includes determining a pose of a user and rendering the AR object as a 2D texture viewed from a viewpoint according to this pose. The rendering may include a latency (i.e., delay, bottleneck) due to its complexity. To accommodate for this latency, the rendering may include estimating where the pose will be at the conclusion of the rendering based on the measurements taken at the start of the rendering. The accuracy of this estimation can affect the quality of the world-locking. A poor estimation can lead to a jitter in the position of the AR element and/or a lag in the repositioning of the AR element in response to a change in pose. It should be noted, the determined pose of the user may also depend on a body position and/or a position of the eye (or eyes) in addition to a head pose of a user, and while the principles of the disclosed techniques can be adapted and/or expanded to use this other/additional pose information, the disclosure will limit its description to a head pose of a user.

A head pose of the user may be described by six degrees of freedom (6DOF), which include position in a three-axis coordinate system (i.e., x, y, z) and rotation in the same three-axis coordinate system (i.e., pitch, roll, yaw). AR glasses can be configured for 6DOF tracking to provide pose information related to the head pose at various times. For example, the 6DOF tracking may include continuously streaming time-stamped head-pose information.

The 6DOF tracking may be performed by a 6DOF tracker 210 that is configured to receive measurements from sensors on the AR glasses. For example, the 6DOF tracker (i.e., 6DOF estimator) may be coupled to an inertial measurement unit (IMU 201) of the AR glasses. The IMU 201 may include a combination of, at least, an accelerometer, a gyroscope and a magnetometer for measurements of position and acceleration along each of the three dimensions. Alone, the IMU 201 may provide a positioning resolution that is insufficient for world locking the AR element accurately. For example, the IMU 201 may not provide accurate depth information about the environment, which can help to render the AR element realistically in the environment. Accordingly, the 6DOF tracker may also be coupled to a camera 202 of the AR glasses. The camera 202 can be configured to capture images of the field of view of the user, which can be analyzed to determine depths of surfaces relative to the user in a field of view. This depth information may be used to increase an accuracy of a determined pose of the user. The 6DOF tracking can be highly accurate when both IMU and camera data are used to compute a pose, but can consume a lot of power, especially when cycled at rates necessary to capture fast movements (i.e., fast head movements, fast environment changes) and a camera is used.

At a first time (t1) the 6DOF tracker outputs 6DoF information (i.e., 6DoF(t1)). The 6DoF information may be used to render the AR element at a location in the display based on an expected viewed position of the anchor point in the environment after the rendering 220 is completed. Accordingly, the rendering may include computing a viewpoint (i.e., pose) from which to render the texture.

Figure 3:
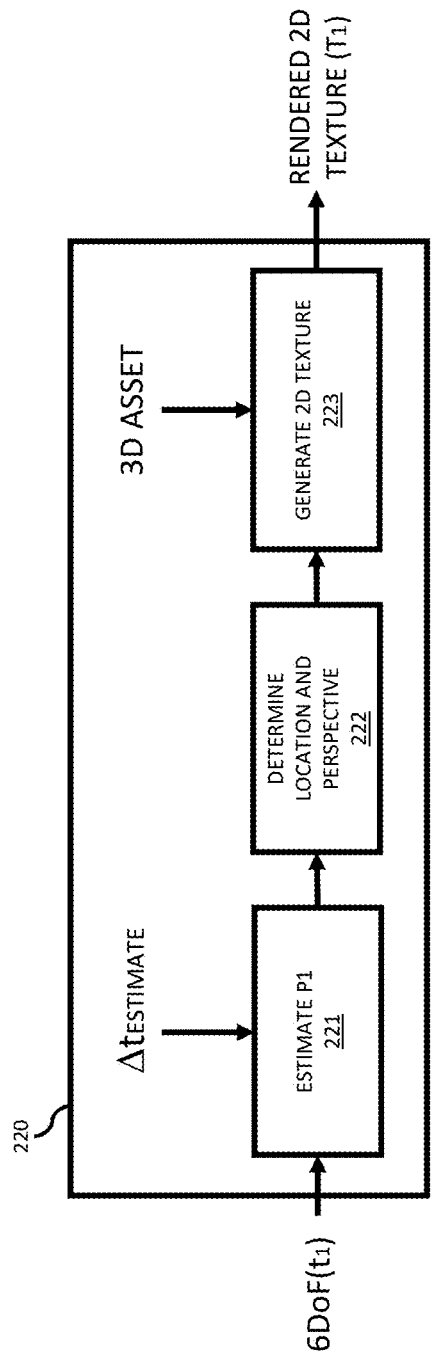
FIG. 3 is a flowchart illustrating details of the rendering process of FIG. 2 according to a possible implementation of the present disclosure.

FIG. 3 illustrates a flow chart of a method for rendering a 2D texture based on 6DoF information according to a possible implementation of the present disclosure. The rendering 220 is a computationally complex process that may have a significant latency period, which when longer than a head movement, can lead to a noticeable lag in the displayed position. Accordingly, the rendering may include estimating (i.e., predicting) a first pose (P1) of the head at the end of the rendering. In other words, the 6DoF information (i.e., 6DoF (t1)) and the estimate of the latency period ($\Delta t_{estimate}$) may be used to estimate 221 the first pose (P1) for rendering. For example, the 6DOF tracking obtained at the first time (t1) may be processed to determine a trajectory of a head movement. Then, the head movement may be projected along the determined trajectory for the estimated latency period to estimate the first pose (P1). The accuracy of the first pose depends on the accuracy of the determined trajectory (i.e., the 6DoF measurements) and the estimate of the latency period. The rendering 220 may further include determining 222 a location on the display that correlates with the real-world anchor position of the AR element and determining the viewpoint from which anchor point is viewed. The rendering may further include generating 223 a 2D texture of a 3D asset. The 3D asset may be recalled from memory and processed to determine a rendered 2D texture (T1). The processing may include transforming the 3D asset into a 2D image with perspective features so that it appears as viewed from the viewpoint of the first pose.

In practice, the actual latency period ($\Delta t_{actual}$) of the rendering can vary and may be different from the estimated latency ($\Delta t_{estimate}$). As a result, at a second time (t2) when the rendering ends, the actual pose of the user's head may not equal the estimated first pose (P1). As a result, the rendering may be displayed at a position that does not match the desired anchor point in the real environment. To compensate for the inaccurate pose estimation, the method further includes time warping (i.e., warping 230) the texture after rendering. The warping 230 includes shifting and/or rotating the rendered texture to register it at the proper viewpoint. Because the shifting/rotating of the warping 230 may be much less computationally complex than the rendering, it may be performed much faster so that the correction does not add any significant latency, which could lead to a noticeable artifact (e.g., jitter, lag) in the display. Accordingly, in the split architecture the warping may be performed on the AR glasses, while the rendering may be performed on a computing device.

Figure 4:
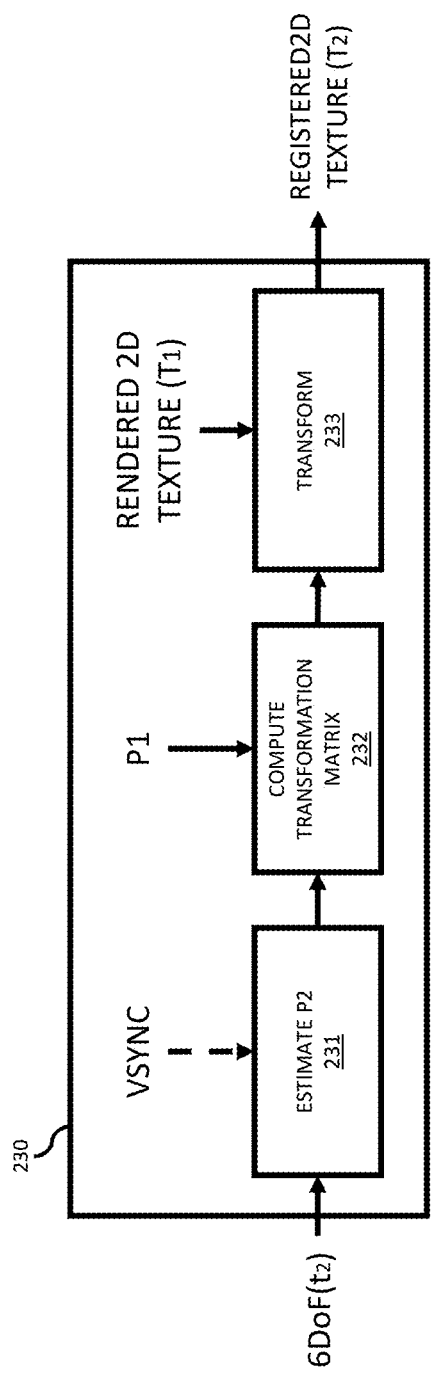
FIG. 4 is a flowchart illustrating details of the warping process of FIG. 2 according to a possible implementation of the present disclosure.

FIG. 4 illustrates a method for warping a rendered texture according to a possible implementation of the present disclosure. The warping 230 includes estimating 231 a second pose (P2) based on 6DOF information (6DoF($t_2$)) obtained at a second time (t2) after rendering. In other words, the second pose (P2) corresponds to the actual pose of the user's head after the rendering 220. The warping 230 may further include comparing the first pose (P1) (i.e., estimated pose after rendering) with the second pose (P2) (i.e., actual pose after rendering) to determine an amount and/or type of warping required to register the rendered AR element with the second pose. For example, the warping may include computing 232 a transformation matrix representing a warp (i.e., a warp transformation matrix) from the first pose (P1) and the second pose (P2). The warping 230 may further include applying (e.g., multiplying) the rendered texture ($T_1$) to the warp transformation matrix (W) in order to transform 233 the rendered texture into a warped 2D texture (i.e., registered 2D texture) (T2). The transformation process may be referred to as a perspective transformation. The registered 2D texture corresponds to the latest (and more accurate pose information) capture at the second time.

Capturing the pose information for warping may occur on a regular basis. Accordingly, in some implementations the estimating the second pose may be triggered by a synchronization signal (VSYNC) related to the display of the AR glasses. In some implementations, timing derived from the synchronization signal (VSYNC) may provide an estimate of a latency that can be used for estimating the second pose. As shown in FIG. 2, after the warping 230 the method 200 to display a world-locked AR element on a display of AR glasses may include displaying 240 the registered texture on a display of the AR glasses.

When the first pose (P1) matches the second pose (P2) no warping is necessary. In this case warping 230 may be skipped (e.g., not triggered) or an identity-warp transformation matrix may be applied. For example, the first pose may match the second pose when there is no head motion during the rendering or when the estimated latency period (i.e., estimated latency) used to generate the first pose (P1) matches the actual latency of the rendering.

The warping may operate at any time after rendering. Accordingly, the rendering may repeat at an application rendering rate, while the warping may be repeated at a higher rate (e.g., a display rate). Because the processes can run independently, the warping operates asynchronously with the rendering. As a result, the warping may be referred to as asynchronous time warping (ATW).

Figure 5:
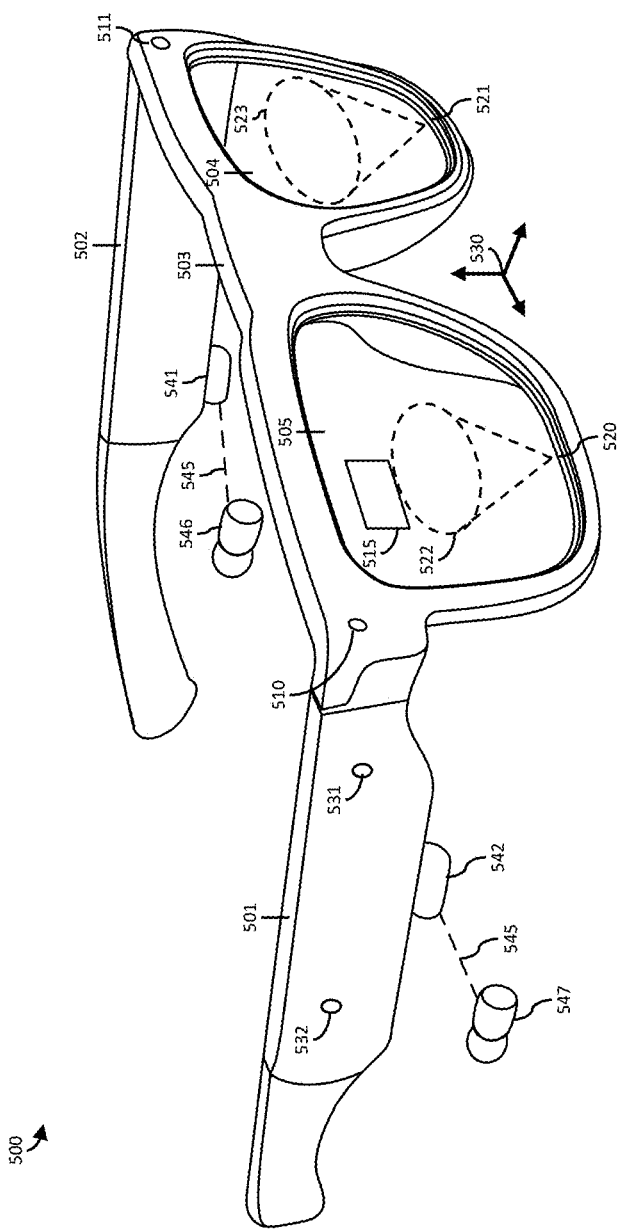
FIG. 5 is a perspective view of AR glasses according to a possible implementation of the present disclosure.

FIG. 5 is a perspective view of AR glasses according to a possible implementation of the present disclosure. The AR glasses 500 are configured to be worn on a head and face of a user. The AR glasses 500 include a right earpiece 501 and a left earpiece 502 that are supported by the ears of a user. The AR glasses further include a bridge portion 503 that is supported by the nose of the user so that a left lens 504 and a right lens 505 can be positioned in front a left eye of the user and a right eye of the user respectively. The portions of the AR glasses can be collectively referred to as the frame of the AR glasses. The frame of the AR glasses can contain electronics to enable function. For example, the frame may include a battery, a processor, a memory (e.g., non-transitory computer readable medium), and electronics to support sensors (e.g., cameras, depth sensors, etc.), and interface devices (e.g., speakers, display, network adapter, etc.). The AR glasses may display and sense relative to a coordinate system 530. The coordinate system 530 can be aligned with a user's head pose when wearing the AR glasses. For example, the eyes of the user may be along a line in a horizontal (e.g., x-direction) direction of the coordinate system 530.

A user wearing the AR glasses can experience information displayed within the lens (or lenses) so that the user can view virtual elements within their natural field of view. Accordingly, the AR glasses 500 can further include a heads-up display (i.e., AR display, see through display) configured to display visual information at a lens (or lenses) of the AR glasses. As shown, the heads-up display may present AR data (e.g., images, graphics, text, icons, etc.) on a portion 515 of a lens (or lenses) of the AR glasses so that a user may view the AR data as the user looks through a lens of the AR glasses. In this way, the AR data can overlap with the user's view of the environment. The portion 515 may include part or all of a lens (or lenses) of the AR glasses.

The AR glasses 500 can include a camera 510 (e.g., RGB camera, FOV camera) that is directed to a camera field-of-view that overlaps with the natural field-of-view of the user's eyes when the glasses are worn. In a possible implementation, the AR glasses can further include a depth sensor 511 (e.g., LIDAR, structured light, time-of-flight, depth camera) that is directed to a depth-sensor field-of-view that overlaps with the natural field-of-view of the user's eyes when the glasses are worn. Data from the depth sensor 511 and/or the FOV camera 510 can be used to measure depths in a field-of-view (i.e., region of interest) of the user (i.e., wearer). In a possible implementation, the camera field-of-view and the depth-sensor field-of-view may be calibrated so that depths (i.e., ranges) of objects in images from the FOV camera 510 can be determined in depth images, where pixel values correspond with depths measured at positions corresponding to the pixel positions.

The AR glasses 500 can further include an eye-tracking sensor. The eye tracking sensor can include a right-eye camera 520 and a left-eye camera 521. The right-eye camera 520 and the left-eye camera 521 can be located in lens portions of the frame so that a right FOV 522 of the right-eye camera includes the right eye of the user and a left FOV 523 of the left-eye camera includes the left eye of the user when the AR glasses are worn.

The AR glasses 500 can further include one or more microphones. The one or more microphones can be spaced apart on the frames of the AR glasses. As shown in FIG. 5, the AR glasses can include a first microphone 531 and a second microphone 532. The microphones may be configured to operate together as a microphone array. The microphone array can be configured to apply sound localization to determine directions of the sounds relative to the AR glasses.

The AR glasses may further include a left speaker 541 and a right speaker 542 configured to transmit audio to the user. Additionally, or alternatively, transmitting audio to a user may include transmitting the audio over a wireless communication link 545 to a listening device (e.g., hearing aid, earbud, etc.). For example, the AR glasses may transmit audio to a left wireless earbud 546 and to a right earbud 547.

The size and shape of the AR glasses may impact the resources available for power and processing. Accordingly, the AR glasses may communicate wirelessly with other devices. The wireless communication may facilitate the devices to share processing, which can mitigate their impact on the available resources of the AR glasses. A process that utilizes the AR glasses for a portion of the processing and another device for a second portion of the processing may be referred to as a split architecture.

A split architecture may advantageously divide the resources according to the capabilities of devices. For example, when the AR glasses are in a split architecture with a mobile phone, the mobile phone's faster processor and larger battery may be used for computationally complex processes, while the sensors and display of the AR glasses may be used for sensing a user and displaying AR elements to the user.

Figure 6:
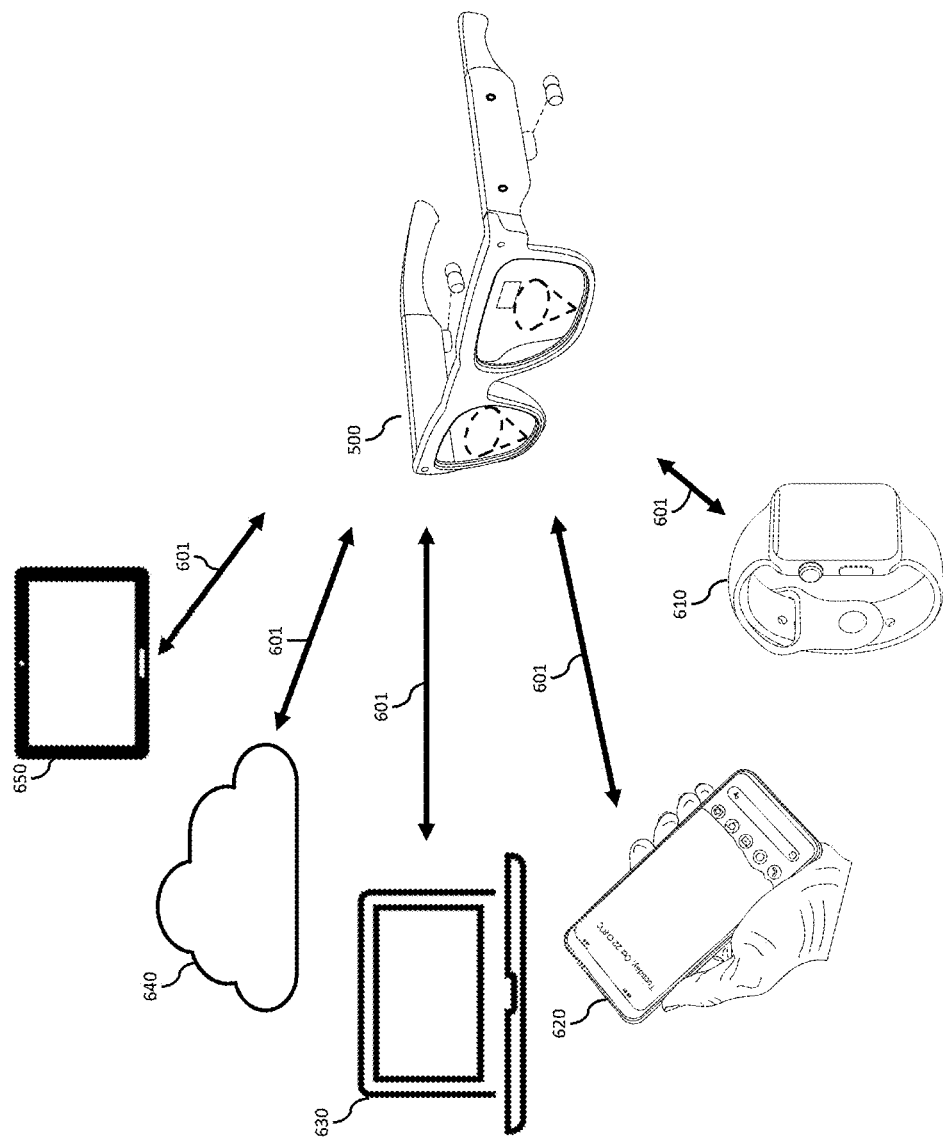
FIG. 6 illustrates possible split architectures according to possible implementations of the present disclosure.

FIG. 6 illustrates possible split architectures according to possible implementations of the present disclosure. As shown, the AR glasses 500 can include a wireless interface (i.e., wireless module) that can be configured to communicate wirelessly with other devices (i.e., can be communicatively coupled to other devices). The wireless communication may occur over a wireless communication channel 601. The wireless communication may use a variety of wireless protocols, including (but not limited to) WiFi, Bluetooth, ultra-wideband, mobile technology (4G, 5G). The other devices in communication with the AR glasses may include (but are not limited to) a smart watch 610, a mobile phone 620, a laptop computer 630, a cloud network 640, a tablet 650, and the like. The split architecture can include the AR glasses in wireless communication with non-mobile computing devices or mobile computing devices, and in some implementations can include the AR glasses in wireless communication with two or more computing devices. While these variations are within the scope of the disclosure, the particular implementation where the AR glasses are in a split architecture with a single mobile computing device, such as a mobile phone 620 (i.e., smart phone), is described in detail.

Returning to FIG. 2, the method to display a world-locked AR element on a display of AR glasses can be implemented using a split architecture. For example, while the measurements of the user and the measurements of the user's environment may be performed by an IMU 201 and a camera 202 of the AR device, it may be desirable to perform the 6DoF tracking 210 and rendering 220 on a mobile phone for at least the reason that their computational complexity could overwhelm the resources of the AR glasses. Conversely, it may be desirable to implement the warping 230 and displaying 240 on the AR glasses because it may be desirable to minimize a delay between the warping 230 and the displaying 240 of the AR element on a display of the AR glasses for at least the reason that doing so can help to prevent artifacts (e.g., jitter, lag) associated with the display.

One technical problem with splitting these functions (i.e., steps, processes, operations) of the method 200 between the AR glasses 500 and the mobile phone 620 is associated with the wireless communication. The wireless communication can introduce a large latency that is highly variable. For example, a latency in a split architecture can be hundreds of milliseconds (e.g., 300 ms) compared to a latency of tens of milliseconds (e.g., 28 ms) in a non-split architecture. The large, and highly variable, latency can make the estimations less accurate which can lead to artifacts in the display of the AR element. The present disclosure describes an approach to make the generation of a world-locked AR element over a split architecture more accurate, which may have the technical effect of minimizing artifacts associated with its display. The implementation of displaying one world-locked AR element on a display will be discussed but it should be noted that the principles of the disclosed approach may be expanded to accommodate the display of multiple world-locked AR elements simultaneously.

Figure 7:
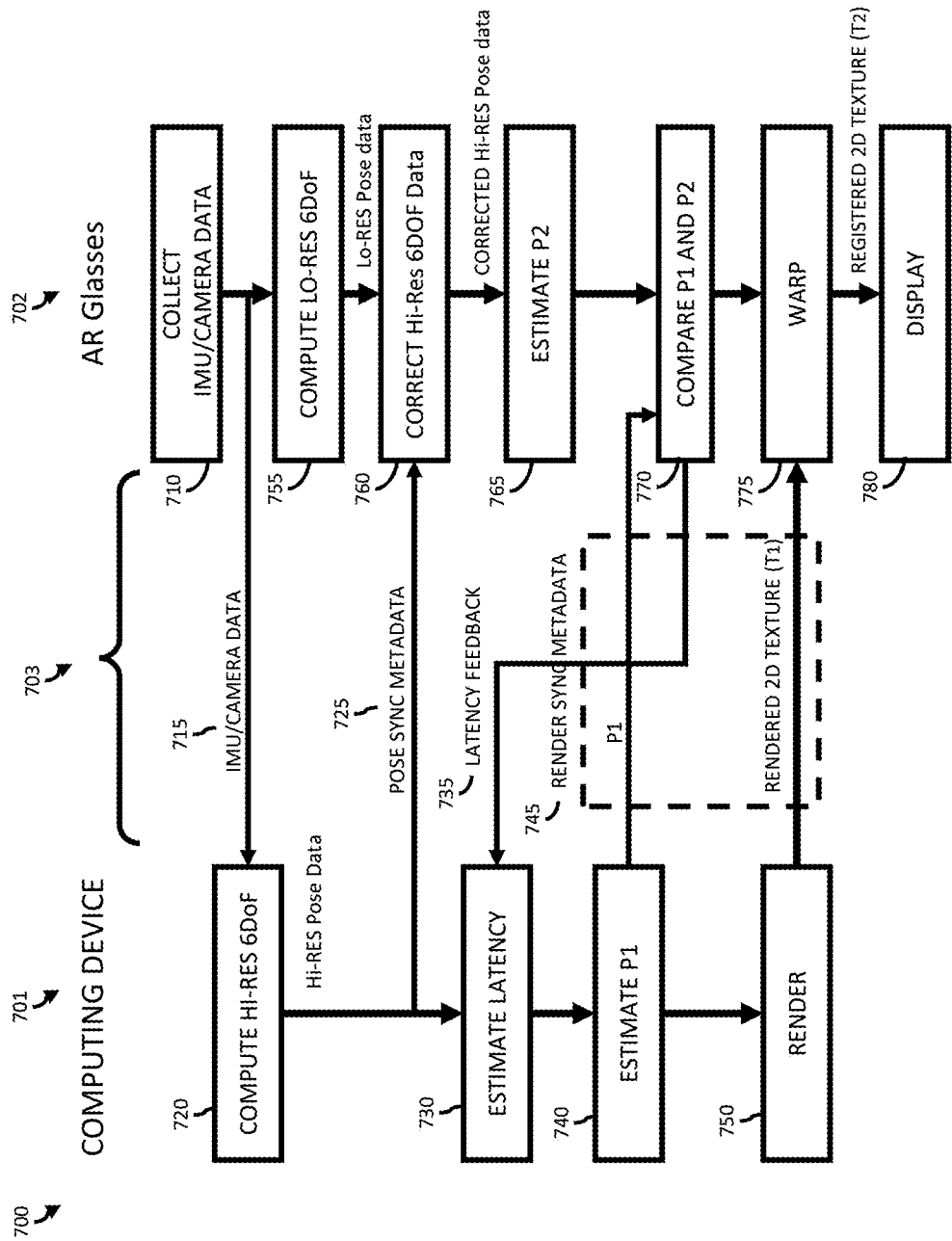
FIG. 7 illustrates a flowchart of a method for augmented reality using a split architecture according to a possible implementation of the present disclosure.

FIG. 7 illustrates a method for displaying world-locked elements on a display (i.e., AR display) of an AR device (e.g., AR glasses) according to an implementation of the present disclosure. The method 700 illustrates the split-architecture in which a first portion of the operations of the method (i.e., computing device thread 701) are performed on a computing device (e.g., mobile phone), while a second portion of the operations of the method (i.e., AR glasses thread 702) are performed on AR glasses. The computing device and the AR glasses are physically separate and each configured to exchange information over a wireless communication channel 703. The flowchart of the method 700 further illustrates information (e.g., metadata) exchanged between the two devices over the wireless communication channel 703.

As shown, in the split architecture, the AR glasses are configured to collect sensor data that can be used to determine a position/orientation (i.e., pose) of the user (i.e., head). The AR glasses may be configured to collect (i.e., measure) IMU data using an IMU of the AR glasses and to capture image and/or range data using a camera of the AR glasses.

The AR glasses thread 702 of the method 710 includes collecting 710 IMU/camera data. This IMU/camera data collection may be triggered by the computing device. For example, an application running on a mobile phone may request the AR glasses to start sending a stream of IMU data and a stream of camera data from the AR glasses. Accordingly, in the method, the AR glasses may transmit the collected IMU/camera data 715 from the AR glasses to the computing device. The data transmission may include a data stream or periodic measurements.

The computing device may include a high-resolution 6DoF tracker (i.e., 6DoF estimator) that is configured to output position/orientation data (i.e., pose data) based on the received IMU/camera data. The pose data is high-resolution for at least the reason that it is based, in part, on the camera data. The high-resolution pose data (i.e., Hi-Res pose data) may correspond to a high-resolution measurement of the user's head pose. In the disclosure, high-resolution is taken to mean a higher resolution than a low-resolution, where, for example, low-resolution pose data can be based on IMU data alone. Further, "high-resolution," as used herein, implies higher accuracy (i.e., higher fidelity) than "low-resolution." In other words, high-resolution pose data (e.g., captured by high-resolution tracking) can be more accurate than low-resolution pose data (e.g., captured by low-resolution tracking).

The computing device thread 701 of the method 700 includes computing 720 high-resolution pose data based on the received IMU/camera data 715. The Hi-Res pose data may be included in pose sync metadata 725 that is transmitted back to the AR glasses. The transmission may occur on a periodic basis or as requested. Accordingly, the method 700 can include periodically transmitting pose sync metadata 725 from the computing device to the AR glasses. The transmission can allow the AR glasses to obtain a high-resolution position/orientation measurement without having to perform its own high-resolution pose estimation, which can be computationally complex. The Hi-Res pose data received at the AR glasses may be based on IMU data and camera data captured at a first time before rendering.

As discussed previously, the position/orientation data and an estimated latency may be used to estimate a pose (i.e., first pose). Accordingly, the computing device thread 701 of the method 700 may further include estimating 730 a latency of the rendering 750. The latency estimate may be performed for each repetition (i.e., cycle) of the method 700, and may vary from cycle to cycle. For example, the latency for a current cycle of the method may be increased or decreased from a previous value to minimize an error in the latency from a previous cycle. As will be discussed later, this error may be fed back from the AR glasses as latency feedback 735 (i.e., feedback).

The computing device thread 701 of the method 700 may further include estimating 740 a first pose (P1) of the user based on the Hi-Res pose data and the estimated latency. As previously mentioned, the first pose (P1) can be the position/orientation of the head expected at the conclusion of the estimated latency period so that the latency of the rendering does not introduce errors in the display of rendered 2D texture, such as errors in the displayed position and/or displayed perspective of the rendered 2D texture on the display. After estimating the first pose (P1), the computing device thread 701 of the method 700 may further include rendering 750 a 2D texture (T1) based on the first pose.

The rendered 2D texture (T1) and the first pose (P1) may be included in render sync metadata 745 that is transmitted from the computing device to the AR glasses so that the glasses may receive the rendered texture without having to perform the computations associated with the rendering 750. Accordingly, the method 700 further includes transmitting render sync metadata 745 from the computing device to the AR glasses. The transmission may be triggered by a new pose and/or rendered 2D texture (T1).

The AR glasses can be used to perform the warping because, as mentioned previously, this is a relatively simple operation compared to the rendering and because it is closely tied to the display, which is performed by the AR glasses. As discussed, a warp transformation (i.e., warping) requires the estimation of a second pose (P2) of the user (e.g., the head) after the rendering. The AR glasses do not include a Hi-Res 6DoF tracker because its computational burden may be high. Instead, the AR glasses can include a low-resolution tracker for measuring the position/orientation (i.e., pose) of the user (e.g., head). The low-resolution 6DoF tracker may be configured to compute Lo-Res pose data from the IMU data collected by the IMU of the AR glasses. By not computing 6DoF data using camera data, the low-resolution 6DoF tracker may save resources by eliminating image processing associated with the pose estimation. What results is pose data that is of a lower resolution than estimated using camera data. Accordingly, the AR glasses thread 702 of the method 700 includes computing 755 low-resolution pose data (i.e., Lo-Res pose data) based on received IMU data collected by the AR glasses.

The Lo-Res pose data may be used to correct the Hi-Res pose data transmitted from the computing device. When the Hi-Res pose data is received at the AR glasses it may be inaccurate (i.e., old). The inaccuracy may be due to a delay associated with the communication over the wireless channel 703 and/or a latency associated with the rendering. For example, at the conclusion of the rendering the computing device may transmit the Hi-Res pose data used for the rendering to the AR glasses. The Lo-Res pose data includes accurate (i.e., latest) information about the position and orientation of the head. For example, the Lo-Res pose data may be collected after the rendering is completed. Accordingly, the Lo-Res pose data may include the latest pose information about the user, which can correct the inaccuracies in the (older) Hi-Res pose data. In other words, the high-resolution pose data may be based on the IMU data and the camera data captured at a first time before rendering, while the IMU data for the low-res pose data may be captured at a second time after rendering. Accordingly, correcting the Hi-Res pose data may include modifying the high-resolution pose data captured at the first time using the IMU data captured at the second time to generate the corrected-high-resolution pose data, which corresponds to a pose of the user at the second time.

The AR glasses thread 702 of the method 700 includes correcting 760 the Hi-resolution pose data based on the computed Lo-Res pose data. What results is corrected-Hi-Res pose data that represents the pose of the user's head at a later time closer to the time of display. In other words, the Hi-Res 6DoF data may correspond to a pose at a first time (t1) (i.e., before rendering), the Lo-Res 6DoF data may correspond to a pose at a second time (t2) (i.e., after rendering), and the corrected Hi-Res 6DoF data may be the Hi-Res 6DoF data from the first time (t1) adapted to the second time (t2).

The AR glasses thread 702 of the method 700 may further include estimating 765 a second pose (P2) of the user based on the corrected Hi-Res pose data. As previously mentioned, the first pose (P1) can be the expected position/orientation of the head at the conclusion of an estimated latency period while the second pose (P2) can be the actual position/orientation of the head at the conclusion of an actual latency period. The AR glasses thread 702 of the method 700 may further include comparing 770 the first pose (P1) and the second pose (P2) to evaluate the estimate of the latency period. For example, if the first pose (P1) and the second pose (P2) match, then the estimated latency period matches the actual latency period and there is no latency error in the estimate. If, however, the first pose (P1) and the second pose (P2) do not match, then there is an error in the estimated latency period. This error may be corrected (e.g., during the next rendering cycle) by latency feedback 735 transmitted to the computing device. The latency feedback 735 may correspond to an error between the estimated latency and an actual latency computed based on the comparison between the first pose (P1) and the second pose (P2). The latency feedback may be used to decrease or increase an estimated latency for a subsequent rendering cycle. The amount of increase or decrease in the estimated latency may be determined based on an algorithm configured to minimize an error between the estimated latency and the actual latency.

After the second pose is estimated, the AR glasses thread 702 of the method 700 may further include warping 775 the rendered 2D texture (t1). For example, the warping 775 may include computing 232 a warp transformation matrix from the first pose (P1) and the second pose (P2) (i.e., based on the comparison between P1 and P2). The warping 230 may further include applying (e.g., multiplying) the rendered 2D texture (T1) from the computing device to the warp transformation matrix (W) in order to transform the rendered 2D texture (T1) into a registered 2D texture (T2). The registered 2D texture (T2) corresponds to the latest (and more accurate pose information) captured after rendering.

After the registered 2D texture (T2) is generated, the AR glasses thread 702 of the method 700 may further include displaying 780 the registered 2D texture (T2). The registered 2D texture (T2) may include information to help determine where the AR element is displayed on a display of the AR glasses. The metadata exchanged in the split architecture can help to enable operation despite the independent operation of the rendering and the warping.

The exchanged metadata can include pose synchronization (i.e., sync) metadata 725. Pose sync metadata can include an estimate of a pose (i.e., Hi-Res 6DoF data), which can be associated with a time stamp. The pose sync metadata 725 can further include estimates to help the correction of the 6DoF data at the AR glasses. For example, the pose sync metadata can include an estimated device velocity, an estimated IMU bias, an estimated IMU intrinsic, and an estimated camera extrinsic. The pose sync metadata may be sent periodically (e.g., 10 Hz).

The exchanged metadata can include render synchronization (i.e., sync) metadata 745. The rendered sync metadata can include a pose timestamp used for rendering, the pose used for rendering, a presentation timestamp, a rendered frame (i.e., 2D texture). The render sync metadata may be sent periodically (e.g., 20 Hz).

The rendering process on the computing device may be repeated (i.e., cycled) at a first rate, while the warping process on the AR glasses may be repeated at a second rate. The first rate may not equal the second rate. In other words, the processes may be asynchronous.

The process illustrated by FIG. 7 can be performed by a split-architecture, augmented-reality system that includes the computing device and the AR glasses. The computing device and the AR glasses may each have one or more processors and non-transitory computer readable memory so that they can each be configured to perform processes associated with the rendering and warping described thus far. The computing device and the AR glasses may perform some of their operations in parallel (i.e., simultaneously), as shown in FIG. 7. The metadata described thus far may help to account for, and compensate for, timing differences between the (asynchronous) operations performed by each device.

In the system, the processor(s) of the computing device may be configured by software instructions to receive IMU/camera data and compute high-resolution pose data based on the received IMU/camera data. The processor(s) of the computing device may be further configured by software instructions to receive latency feedback and to estimate a latency of the rendering based on the latency feedback. The processor(s) of the computing device may be further configured by software instructions to estimate a first pose (P1) based on the latency and the Hi-Res pose data and to render the 2D texture (T1) based on the first pose (P1).

In the system, the processor(s) of the AR glasses may be configured by software instructions to compute corrected-high-resolution pose data based on received IMU data and received high-resolution pose data and to estimate a second pose (P2) based on the corrected-high-resolution pose data. The processor(s) of the AR glasses may be further configured by software instructions to compare the second pose (P2) and the first pose (P1) and to warp the 2D texture of the AR element received from the computing device based on the comparison. The processor(s) of the AR glasses may be further configured by software instructions to transmit the warped 2D texture of the AR element to an AR display of the AR glasses.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent to can include laterally adjacent to or horizontally adjacent to.

The invention claimed is:

1. A method for displaying an augmented reality (AR) element on an AR display:
  receiving, at an AR device, an initial two-dimensional (2D) texture of the AR element, the initial 2D texture rendered at a computing device that is coupled to the AR device in a split architecture, wherein the computing device and the AR device are physically separated;
  warping, at the AR device, the initial 2D texture of the AR element, wherein the warping includes:
    receiving, at the AR device, a first pose from the computing device;
    estimating, at the AR device, a second pose;
    computing, at the AR device, a warp transformation based on a comparison of the first pose and the second pose; and
    generating a registered 2D texture of the AR element; and
  triggering display of the registered 2D texture of the AR element on the AR display of the AR device.

2. The method according to claim 1, wherein the initial 2D texture of the AR element is received from a wireless communication channel between the AR device and the computing device.

3. The method according to claim 1, wherein the AR device is AR glasses.

4. The method according to claim 1, wherein the computing device is a mobile phone.

5. The method according to claim 1, further comprising:
  collecting sensor data at the AR device; and
  transmitting the sensor data from the AR device to the computing device over a wireless communication channel.

6. The method according to claim 5, wherein the sensor data includes:
  inertial measurement unit (IMU) data and camera data.

7. The method according to claim 5, further comprising:
  determining, at the AR device, a latency feedback;
  transmitting the latency feedback from the AR device to the computing device over the wireless communication channel; and
  estimating, at the computing device, a latency of the rendering based on the latency feedback, the initial 2D texture of the AR element rendered at the computing device based on the first pose determined using the sensor data and the latency feedback from the AR device.

8. The method according to claim 7, wherein the determining, at the AR device, the latency feedback includes:
  receiving the first pose from the computing device at the AR device;
  estimating, at the AR device, the second pose at the AR device;
  comparing, at the AR device, the first pose and the second pose; and
  determining, at the AR device, the latency feedback based on the comparison.

9. The method according to claim 1, wherein the computing, at the AR device, the warp transformation based on the comparison of the first pose and the second pose includes:
  comparing, at the AR device, the first pose and the second pose; and
  computing, at the AR device, a warp transformation matrix based on the comparison.

10. The method according to claim 9, wherein the warping, at the AR device includes:
  receiving the initial 2D texture of the AR element from the computing device; and
  applying the initial 2D texture of the AR element to the warp transformation matrix to generate the registered 2D texture of the AR element.

11. The method according to claim 1, wherein the estimating, at the AR device, the second pose includes:
  collecting inertial measurement unit (IMU) data and camera data at the AR device;
  transmitting the IMU data and the camera data from the AR device to the computing device;
  receiving high-resolution pose data from the computing device, the high-resolution pose data computed at the computing device based on the IMU data and the camera data;
  computing, at the AR device, low-resolution pose data based on the IMU data;
  correcting, at the AR device, the high-resolution pose data from the computing device using the low-resolution pose data to compute corrected-high-resolution pose data; and
  estimating the second pose based on the corrected-high-resolution pose data.

12. The method according to claim 1, wherein the registered 2D texture of the AR element is world-locked on the AR display to a location in an environment of a user.

13. Augmented-reality (AR) glasses comprising:
  an inertial measurement unit (IMU) configured to collect IMU data;
  a camera configured to capture camera data;
  a wireless interface configured to transmit and receive first information to and from a computing device over a wireless communication channel;
  an AR display configured to display second information to a user of the AR glasses; and
  a processor configured by software to:
    transmit the IMU data and the camera data to the computing device, the computing device configured to:
      compute initial high-resolution pose data based on the IMU data and the camera data;

estimate a first pose based on the initial high-resolution pose data and an estimate of a latency corresponding to rendering; and
render a two-dimensional (2D) texture of an AR element based on the first pose;
receive the initial high-resolution pose data, the first pose, and the 2D texture of the AR element from the computing device;
compute corrected-high-resolution pose data based on the IMU data and the initial high-resolution pose data;
estimate a second pose based on the corrected-high-resolution pose data;
warp the 2D texture of the AR element based on a comparison of the second pose to the first pose; and
trigger display of the warped 2D texture of the AR element on the AR display.

14. The augmented-reality (AR) glasses according to claim 13, wherein the computing device and the AR glasses are communicatively coupled over the wireless communication channel.

15. The augmented-reality (AR) glasses according to claim 13, wherein the warped 2D texture of the AR element is world-locked on the AR display of the AR glasses.

16. The augmented-reality (AR) glasses according to claim 15, wherein the warped 2D texture of the AR element is world locked to a location as part of a navigation application running on the AR glasses.

17. The augmented-reality (AR) glasses according to claim 13, wherein to compute the corrected-high-resolution pose data based on the IMU data and the initial high-resolution pose data, the AR glasses are configured to:
receive the initial high-resolution pose data from the computing device, the initial high-resolution pose data based on the IMU data and the camera data captured at a first time before rendering;
collect the IMU data at a second time after rendering; and
modify the initial high-resolution pose data captured at the first time using the IMU data captured at the second time to generate the corrected-high-resolution pose data, which corresponds to a pose at the second time.

18. The augmented-reality (AR) glasses according to claim 13, wherein to estimate the latency of rendering, the computing device is configured to:
receive feedback from the AR glasses, the feedback based on the comparison of the second pose to the first pose; and
update the estimate of the latency based on the feedback.

19. The augmented-reality (AR) glasses according to claim 13, wherein the computing device is a mobile phone or tablet computer.

20. A split-architecture, augmented-reality (AR) system comprising:
a computing device configured to:
compute initial high-resolution pose data;
estimate a latency of rendering;
estimate a first pose based on the latency of rendering and the initial high-resolution pose data; and
render a two-dimensional (2D) texture of an AR element based on the first pose; and
AR glasses communicatively coupled to the computing device, the AR glasses configured to:
collect inertial measurement unit (IMU) data and camera data;
compute corrected-high-resolution pose data based on the IMU data and the initial high-resolution pose data;
estimate a second pose based on the corrected-high-resolution pose data;
compare the second pose and the first pose;
warp the 2D texture of the AR element based on the comparison of the second pose to the first pose; and
display the warped 2D texture of the AR element on an AR display of the AR glasses.

* * * * *